United States Patent
Gupta et al.

(10) Patent No.: US 11,429,458 B2
(45) Date of Patent: Aug. 30, 2022

(54) ARCHITECTURE FOR LARGE PAYLOAD HANDLING IN EVENT PIPELINE

(71) Applicant: Expedia, Inc., Seattle, WA (US)

(72) Inventors: Gaurav Kumar Gupta, Gurgaon (IN); Rahul Verma, New Delhi (IN)

(73) Assignee: Expedia, Inc., Seattle, WA (US)

( * ) Notice: Subject to any disclaimer, the term of this patent is extended or adjusted under 35 U.S.C. 154(b) by 3 days.

(21) Appl. No.: 16/937,231

(22) Filed: Jul. 23, 2020

(65) Prior Publication Data

US 2021/0389998 A1 Dec. 16, 2021

(30) Foreign Application Priority Data

Jun. 10, 2020 (IN) .............................. 202011024445

(51) Int. Cl.
*G06F 9/54* (2006.01)
*G06F 9/48* (2006.01)

(52) U.S. Cl.
CPC ............ *G06F 9/542* (2013.01); *G06F 9/4881* (2013.01); *G06F 9/544* (2013.01)

(58) Field of Classification Search
CPC ......... G06F 9/542; G06F 9/4881; G06F 9/544
See application file for complete search history.

(56) References Cited

U.S. PATENT DOCUMENTS

| 8,122,006 B2 * | 2/2012 | De Castro Alves ........................ G06F 16/2453 707/713 |
| 2014/0156683 A1 * | 6/2014 | De Castro Alves ........................ G06F 16/24568 707/755 |
| 2017/0116089 A1 * | 4/2017 | Park ....................... G06F 16/128 |
| 2018/0075107 A1 * | 3/2018 | Park ........................ G06F 16/21 |

* cited by examiner

*Primary Examiner* — S. Sough
*Assistant Examiner* — Kimberly L Jordan
(74) *Attorney, Agent, or Firm* — Knobbe, Martens, Olson & Bear, LLP (57) ABSTRACT

Systems and methods are provided for automatically orchestrating the handling of events through a processing pipeline without limitation (or without a substantial limitation) as to the size of the event payload associated with the event. The event pipeline system stores event payloads in data stores and generates notifications regarding the events. The notifications may be placed into event streams for handling by various processing components of the event pipeline system. The processing components may receive notifications or events that they are to process, and may separately access event payloads from the data stores. The processing components may generate and save processed event payloads to the data stores in a streaming fashion such that the computing resources of the processing components do not limit (or substantially limit) the size of the event payloads that the processing components may handle.

20 Claims, 6 Drawing Sheets

ARCHITECTURE FOR LARGE PAYLOAD HANDLING IN EVENT PIPELINE

INCORPORATION BY REFERENCE TO ANY PRIORITY APPLICATIONS

Any and all applications for which a foreign or domestic priority claim is identified in the Application Data Sheet of the present application are hereby incorporated by reference in their entireties under 37 CFR 1.57.

BACKGROUND

Computing systems can utilize communication networks to exchange data. Data centers may include a number of interconnected computing systems to provide computing resources to internal and/or external users. In a common implementation, a data center provides data storage services configured to store data submitted by client devices, data processing services configured to process the submitted data, and data delivery services configured to deliver the processed data. For example, data providers may submit data periodically or in response to particular events. Data subscribers may subscribe to and receive data processed by the data center, periodically or in repose to particular events.

DETAILED DESCRIPTION

The present disclosure is directed to an event pipeline system that automatically orchestrates the handling of events through a processing pipeline without limitation (or without a substantial limitation) as to the size of the event payload associated with the event. The event pipeline system stores event payloads in data stores and generates notifications regarding the events. The notifications may be placed (e.g., queued) into event streams for handling by various processing components of the event pipeline system. The processing components may receive notifications of events that they are to process, and may separately access corresponding event payloads from the data stores. The processing components may generate and save processed event payloads to the data stores in a streaming fashion such that the computing resources of the processing components do not limit (or substantially limit) the size of the event payloads that the processing components may handle. Illustratively, the processing components may transform individual event payloads, batch multiple event payloads from an event stream in to a single event payload for another event stream, join multiple event payloads from different event streams into a single event payload for another event stream, deliver a single event payload to multiple subscribers, perform other event payload processing actions, or perform any combination thereof.

Generally described, the term "event" refers to data received by an event pipeline system to be provided—in processed and/or unprocessed form—to one or more subscribers. The data may be received as an event payload of a transmission to the event pipeline system, and the event payload is ingested by the event pipeline system. In some embodiments, the entire transmission associated with the event is ingested by the event pipeline system and stored as the event payload. An "event stream" is a discrete set of events accessible separately from other discrete sets of events of other event streams handled by the event pipeline system. As events are ingested by the event pipeline system, they are placed into one or more event streams. Event subscribers may receive events that have been placed into one or more event streams. Intermediate processing steps of the event pipeline system may access events from event streams and add the events—or data derived therefrom—to other event streams. The events in an event stream may or may not be sequential in nature.

Conventional event pipeline systems store event records in queues to be provided to components for subsequent processing, and the data structure that is queued includes the event payload to be processed by the components. For example, an event may be received by the event pipeline system, and the event data may be placed into a queue for processing by downstream components. As a consequence, the size of the event data structures placed into the queues may be limited based on the processing capabilities of the queues, the throughput requirements of the event pipeline system, the latency or other performance characteristics of the network architecture within which the event pipeline system is implemented, other considerations, or any combination thereof. Thus, when data providers provide event data to such conventional event pipeline systems, they must ensure that the amount of event data does not exceed the limitations of the event pipeline system. If the amount of data will exceed the limitations, then the data providers must reduce the amount of data or implement workarounds. In a similar fashion, processing tasks that are to be performed as part of the event pipeline system and subscribers of data from the event pipeline system may be similarly limited and/or may require similar workarounds. Such limitations may become more apparent and onerous when multiple events are to be batched and/or when events from multiple event streams are to be joined into a single joint event for a single event stream. For at least these reasons, conventional event pipeline systems are not satisfactory in applications involving data-rich events and other scenarios with large and/or ever-increasing quantities of data.

Some aspects of the present disclosure address the issues noted above, among others, through the use of separate notification channels and data stores for incoming events, event streams, and intermediate stages of event handling within an event pipeline system. By separating the event notification channel from the storage of event payload data, different storage solutions may be used that are each advantageously tailored to a different set of storage, access, and transmission requirements. In some embodiments, an event stream may include two separate data stores for the events within the event stream: a first data store for event notifications, such as an event queue; and a second data store for event payload data, such as an object data store. When an event is received by the event pipeline system for placement into an event stream, the event data may be stored as-received (or substantially as-received) in an object data store. The object data store may have no maximum size limit for data objects, or may otherwise be configured such that for practical purposes there is effectively no maximum size limit for the data objects that are received, processed, generated, and delivered by the event pipeline system. In some cases, the event payload data objects may not necessarily be uniform in size, but may be any arbitrary size from event stream to event stream or even within a single event stream. Such event payload data objects may nevertheless be handled by the event pipeline system as data objects to be stored in an object data store. In addition to the data object for the event payload data stored in the object data store, a separate event notification may be generated and stored in a notification data store. The event notification may include an identifier to differentiate the event notification from other event notifications in the event stream (e.g., a unique identification code or combination of data elements collectively serving as a key), a reference to the event payload data object in the object data store (e.g., a unique location path, key, or identifier), a time stamp, an event classification, and payload metadata that may be used by processing components to determine whether and/or how to process an event (e.g., summary, important data from the event payload, etc.). Such event notifications may therefore be smaller—in some cases significantly smaller—than the event payloads with which they are associated. In this way, the relatively small (and in some cases uniformly-sized) event notifications can be managed and distributed efficiently without regard to the size of the event payload data objects that correspond to the events. For example, memory-efficient queues may be implemented, consumers of events may obtain event notifications and determine whether and how to process events without first receiving the entire event payloads, event notifications may be re-queued without also re-saving the corresponding event payloads, etc.

Additional aspects of the present disclosure relate to grouping multiple events from an event stream into a single batched event. An event stream may include any number of individual events that one or more processing components or subscribers are to receive as a single event. In some embodiments, a batch component may generate—periodically or in response to some event—a batched event that includes events placed in a particular event stream within a particular window of time. For example, a batch component may generate an hourly batch of events satisfying a particular criterion (e.g., events associated with a classification or metadata value) from a particular event stream. The batch component may obtain the event notifications satisfying the criterion from the event stream, and iterate through the notifications. For each notification, the batch component may determine the storage location of the corresponding event payload within the object data store for the event stream, obtain the event payload from the object data store, perform any processing, and then store the event payload to a data store of a destination event stream. The event payload may be stored as merely one portion (e.g., record, object, byte array, etc.) of the new event payload for the batch event in the destination event stream. The batch component may repeat this process in a streaming manner for each remaining event to be batched. Advantageously, the streaming batch process allows the batch component to generate a batched event with a large payload from multiple events that have potentially large payloads themselves, without first obtaining the event payload for every event to be batched and maintaining all of the event payloads in memory to generate the batched event payload. Thus, the streaming batch process allows a batch processor with relatively limited memory and/or other processing capabilities in proportion to the batched events being generated to nevertheless generate the batched events efficiently. Once all of the event payloads have been stored in the batched event payload, a single notification may be generated for the batched event. The single notification may be generated in a manner similar to event notifications for events previously received by the event pipeline system: the event notification may include an identifier to differentiate the event notification from other event notifications, a reference to the batch event payload data object in the object data store, related metadata, etc.

Further aspects of the present disclosure relate to grouping events from different event streams into a single joined event. In some embodiments, a set of two or more event streams may include events that one or more processing components or subscribers are to receive as a single event. A join component may generate—periodically or in response to some event—a joined event that includes events placed in the different event streams. For example, a join component may generate a joined event from various events satisfying a particular criterion (e.g., events associated with a classification or metadata value) from two or more event streams. The join component may obtain an event notification from a first event stream and an event notification from a second event stream, and generate a data structure for the joined event data payload in the data store of the joined event stream. For each notification, the join component may determine the storage location of the corresponding event payload, obtain the event payload, perform any processing, and then store the event payload to the joined event data payload. Each of the individual event payloads may be stored as merely one portion (e.g., record, object, byte array, etc.) of the joined event payload. The join component may repeat this process in a streaming manner for each remaining event to be joined. Advantageously, the streaming join process allows the join component to generate a joined event with a large payload from multiple events that have potentially large payloads themselves, without first obtaining the event payload for every event to be joined and maintaining all of the event payloads in memory to generate the joined event payload. Thus, the streaming join process allows a join processor with relatively limited memory and/or other processing capabilities in proportion to the joined events being generated to nevertheless generate the joined events efficiently. Once all of the event payloads have been stored in the joined event payload, a single notification may be generated for the joined event. The single notification may be generated in a manner similar to event notifications for events previously received by the event pipeline system: the event notification may include an identifier to differentiate the event notification from other event notifications, a reference to the joined event payload data object in the object data store, related metadata, etc.

Various aspects of the disclosure will now be described with regard to certain examples and embodiments, which are intended to illustrate but not limit the disclosure. Although aspects of some embodiments described in the disclosure will focus, for the purpose of illustration, on particular examples of events, event streams, event payloads, event notifications, event processing tasks, and the like, the examples are illustrative only and are not intended to be limiting. The technologies disclosed herein may also be utilized with other types of events, event streams, event payloads, event notifications, event processing tasks, and the like. In addition, any feature, process, device, or component of any embodiment described and/or illustrated in this specification can be used by itself, or with or instead of any other feature, process, device, or component of any other embodiment described and/or illustrated in this specification.

Event Pipeline System

Figure 1:
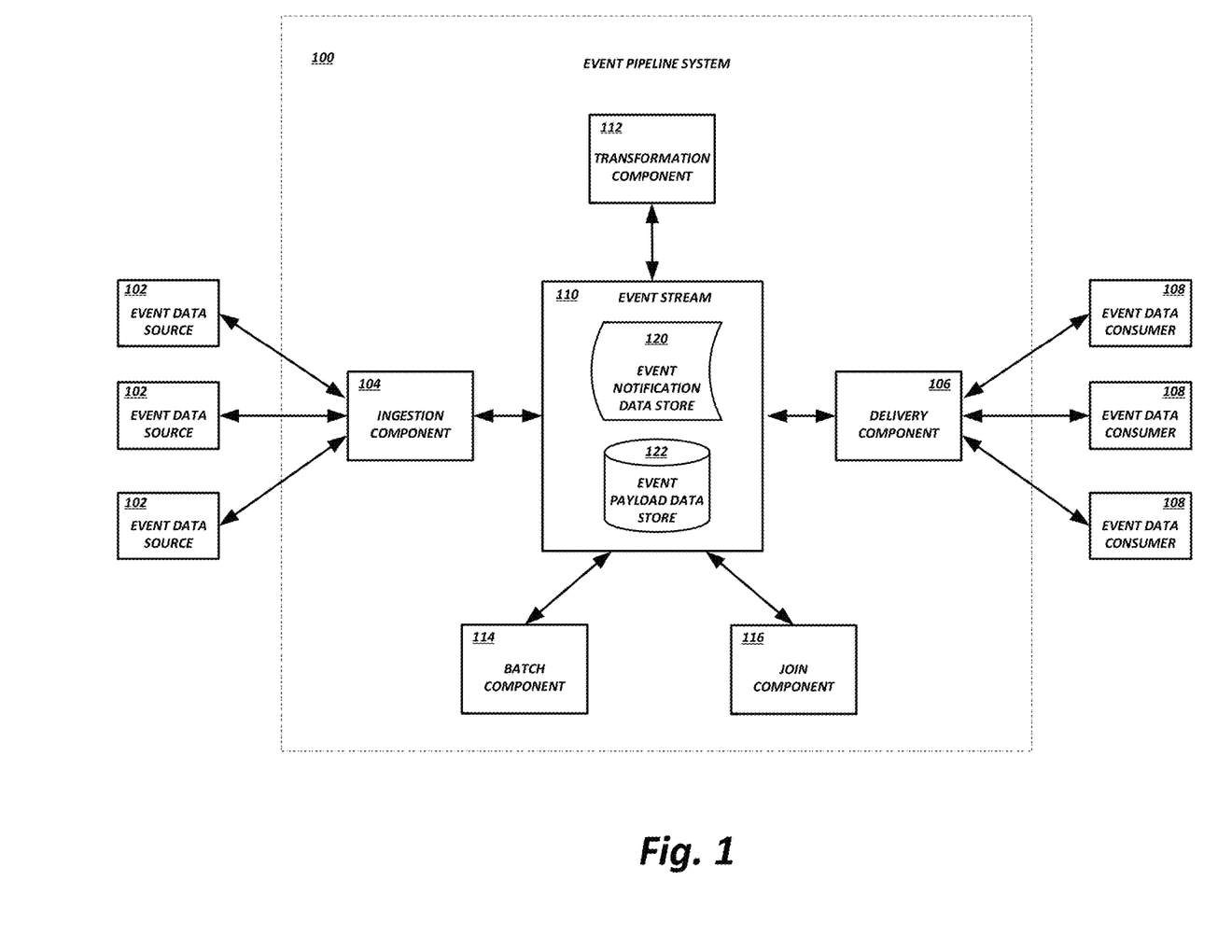
FIG. 1 illustrates a network architecture including components of an event pipeline system according to some embodiments.

FIG. 1 is a block diagram showing a network architecture for an event pipeline system 100, including various modules, components, and subsystems. In some embodiments, as shown, the event pipeline system 100 may include one or more ingestion components 104 to receive event data from event sources 102 and initiate orchestration of the event data through the event pipeline system 100. The event pipeline system 100 may also include one or more delivery components 106 to deliver event data orchestrated by the event pipeline system 100 to event consumers 108. Within the event pipeline system 100, event data may be organized into logical event streams 110 that are implemented using event notification data stores 120 and event payload data stores 122. Processing and other orchestration of event data within the event pipeline system 100 may be implemented by various processing components, such as transformation components 112, batch components 114, and join components 116.

The components of the event pipeline system 100 may be implemented on one or more physical server computing devices. In some embodiments, an ingestion component 104, delivery component 106, data stream 110 (or individual components thereof, such as an event notification data store 120 and/or event payload data store 122), transformation component 112, batch component 114, and/or join component 116 may be implemented on one or more host devices, such as blade servers, midrange computing devices, mainframe computers, or any other computing device configured to provide computing services and resources. For example, a single host device may execute or otherwise host one or more ingestion components 104, delivery components 106, data streams 110 (or individual components thereof), transformation components 112, batch components 114, join components 116, some combination thereof, etc. The event pipeline system 100 may include any number of such hosts. In some embodiments, an event pipeline system 100 may include fewer, additional, and/or alterative components.

The components of the event pipeline system 100 may communicate with each other and/or with event data sources 102 and event data consumers 108 via one or more communication networks. A communication network (also referred to simply as a "network") may be a publicly-accessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

In some embodiments, the features and services provided by the event pipeline system 100 may be implemented as web services consumable via one or more communication networks. In further embodiments, the features of the event pipeline system 100 (or some subset thereof) are provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Event data sources 102 and event data consumers 108 may be external to the event pipeline system 100 such that they are implemented on computing devices that are physically and logically separated from the computing devices that implement the components of the event pipeline system 100. For example, one or more event data sources 102 and/or event data consumers 108 may be computing devices, such as personal computing devices or server computing devices, that are external to a data center in which the computing devices of the event pipeline system 100 are located. The event data sources 102 and/or event data consumers 108 may communicate with the event pipeline system via a public network or a network that is physically and/or logically separated from the network over which the components of the event pipeline system 100 communicate. In some embodiments, any or all of the event data sources 102 and/or event data consumers 108 may be physically or logically part of the event pipeline system 100. For example, an event data source 102 or event data consumer 108 may be implemented on a same computing device as one or more components of the event pipeline system 100, may communicate with components of the event pipeline system 100 using the same network as other components of the event pipeline system 100 use to communicate, etc.

Example Event Orchestration Process

Figure 2:
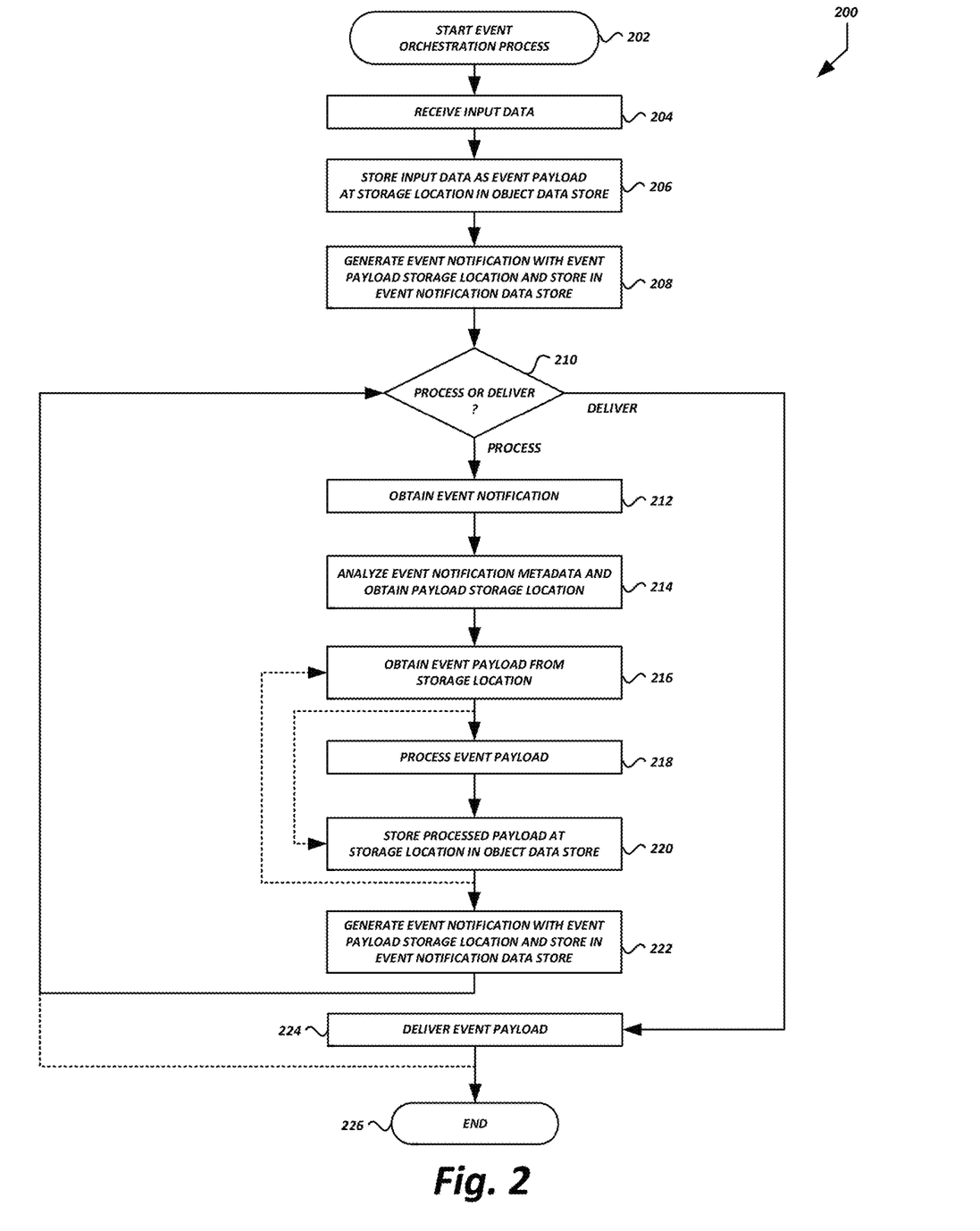
FIG. 2 is a flow diagram of an illustrative process for orchestrating event data through an event pipeline system according to some embodiments.

FIG. 2 is a flow diagram of an illustrative process 200 for orchestrating an event through an event pipeline system 100. The process 200 shown in FIG. 2 is described below with further reference to components of the event pipeline system 100 shown in FIG. 1, the example transformation operation shown in FIG. 3, the example batch operation shown in FIG. 4, and the example join operation shown in FIG. 5.

The process 200 will be described with reference to an illustrative event that is ingested by the event pipeline system 100 and orchestrated through one or more intermediate steps before data derived from the event is provided to one or more event data subscribers. However, in practice various instances of the process 200 or portions thereof may be performed asynchronously, in parallel, and/or recursively depending upon whether and when additional events are provided to the event pipeline system 100, which intermediate processes are to be performed, the sequence in which intermediate processes are to be performed, whether individual events are accessed by and processed by multiple processing components separately (in parallel, asynchronously, etc.), the consumers to which data is to be provided, and the like. For example, in some embodiments an event in a particular event stream may be accessed by and processed by two or more processing components, serially, in parallel, or asynchronously. Data derived from a particular event in a particular event stream by the various processing components may then be sent to two or more different event streams, delivery components, event subscribers, or combinations thereof. Thus, the process 200 may be forked at various points to handle different processing of an event by different components.

Figure 6:
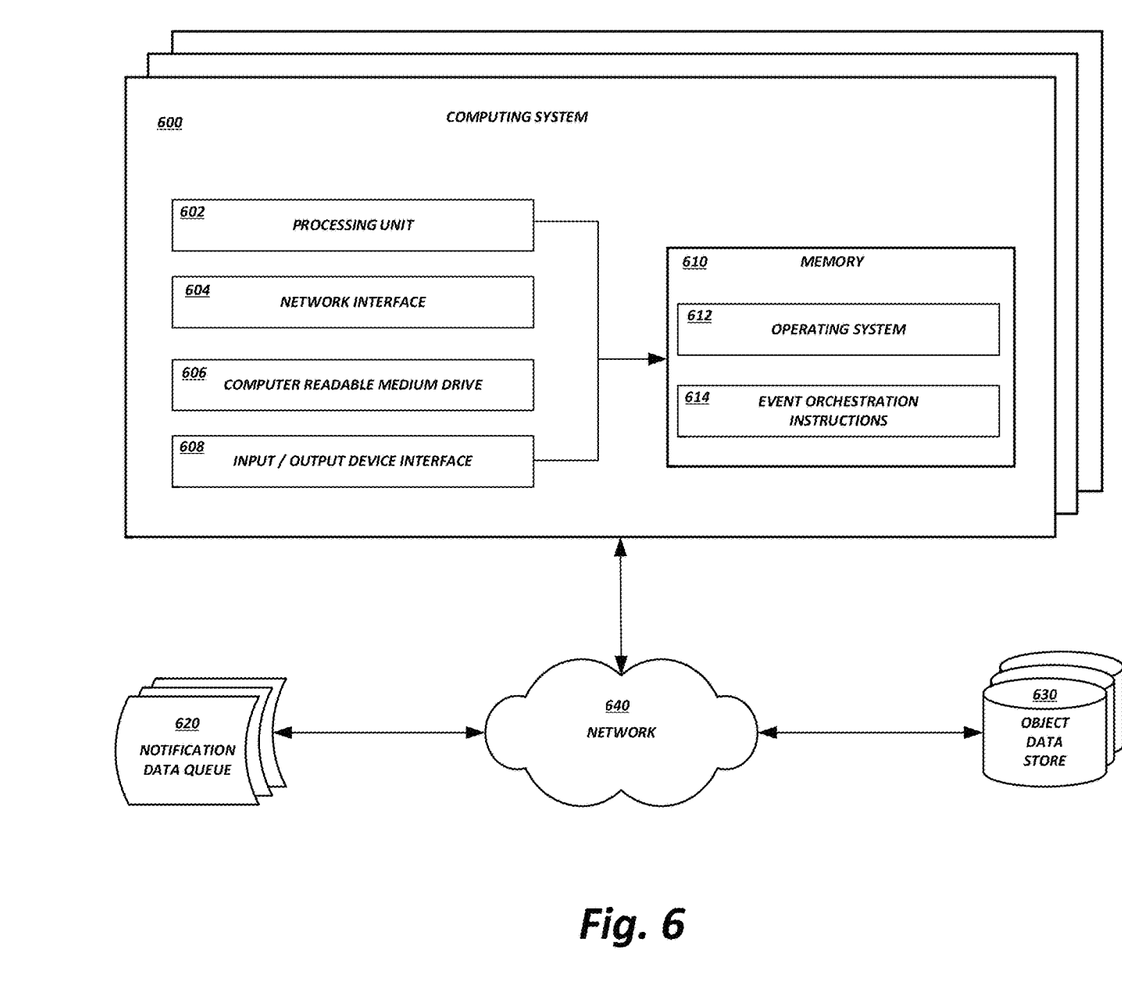
FIG. 6 is a block diagram of illustrative computing systems that implement components of an event pipeline system according to some embodiments.

The process 200 begins at block 202. The process 200 may begin in response to an event, such as when an event provider connects to the event pipeline system 100 or when the event pipeline system 100 begins operation. When the process 200 is initiated, a set of executable program instructions stored on one or more non-transitory computer-readable media (e.g., hard drive, flash memory, removable media, etc.) may be loaded into memory (e.g., random access memory or "RAM") of a computing device. For example, FIG. 6 shows an example computing system 600 in which event orchestration instructions 614 may be loaded into memory 610, and executed by one or more processors 602. In some embodiments, the process 200 or portions thereof may be implemented on multiple processors and or computing systems, serially or in parallel.

At block 204, the event pipeline system 100 may receive event data as input from an event data provider 102. The event data may be received by, or passed to, an ingestion component 104 for placement into an event stream 110 of the event pipeline system 100. The event data may be or include a data object to be processed by or otherwise orchestrated by the event pipeline system 100. Illustratively, the event data may be a data object representing one or more data records, documents, images, videos, files, or the like. In one specific, non-limiting embodiment, the event data may be a data object representing one or more transactions that trigger one or more processing operations orchestrated by the event pipeline system 100. For example, the data object may be a transaction record regarding a reservation of a travel item (e.g., lodging, transportation, etc.) to be processed by the event pipeline system 100, reconciled with a supply record from a corresponding travel item supplier, verified, and recorded.

At block 206, the ingestion component 104 may begin the process of placing the event data into an event stream 110 of the event pipeline system 100. The ingestion component 104 may determine an event stream 110 to which the event data is to be added, and may store the event data into an event payload data store 122 of the event stream 110. The event payload that is stored in the event payload data store 122 may be the event data as-received (or substantially as-received) by the ingestion component 104. As used herein, event data being stored substantially as-received refers to storage without modification to the content of the event data, but potentially with formal modifications to the event data such as serialization of event data from memory to persistent storage, placement of the event data as a raw data object within a container object that is handled by the event payload data store 122, or other similar modifications that do not affect the content of the event data. The ingestion component 104 may determine a particular location within the event payload data store 122 at which the event data is to be stored, or the ingestion component may determine, after sending the event data to the event payload data store 122, the location at which the event data has been stored. For example, the storage location may be represented by a physical or logical path (e.g., a bucket identifier or a directory structure), a network address, or the like.

In some embodiments, the size of the event data that is received by the ingestion component 104 and stored in the event payload data store 122 may be unlimited, or may not be limited for practical purposes. For example, the event payload data store 122 may be an object data store configured to store objects of any arbitrary size up to high limit that, for practical purposes, will not be reached by the type of data being provided to, orchestrated by, and subscribed from the event pipeline system 100 (e.g., hundreds of megabytes, multiple gigabytes, or more).

At block 208, the ingestion component 104 can generate an event notification regarding the received event data and send the event notification to the event notification data store 120 of the event stream 110 to which the event is being added. The event notification may include various information used by event streams and other components to orchestrate handling of the event. In contrast to the event data payload, the size of the event notification may be limited. For example, the size of the event notification may be limited such that only identification data and a limited amount of metadata may be included in the event notification. In this way, the event notification can be provided to a data store configured for high performance management and delivery with low latency, such as a queue from which other components can retrieve or be provided with event notifications without the overhead that would otherwise be required to store and deliver the corresponding event payloads.

The event notification may include an event identifier so that the event stream 110 and other event pipeline system components can access and refer to the event notification specifically and separately from other event notifications associated with the same event stream 110. The event notification may include location data representing the location within the event payload data store 122 at which the corresponding event data payload has been stored as described above. Thus, components that obtain the event notification from the event stream may be enabled to obtain the corresponding event data payload. The event notification may also include additional information used by event streams 110 and other components to orchestrate the event. For example, a timestamp reflecting when the event data was received from the event data provider 102 or when the event notification is generated may be included in the event notification. As another example, an event type or classification may be included in the event notification. In some embodiments, metadata summarizing or highlighting specific details of the event data payload may be included, such as an identity of the source of the event, an identifier of an entity associated with the event, etc. In one specific, non-limiting embodiment, the event notification may include a collection of attribute-value pairs and/or arrays of data. An example of such an event notification schema is shown in Table 1. In the example event notification schema, the text within brackets ("[ ]") and following hashtags ("#") is replaced by the corresponding event notification data values.

TABLE 1

```
{
  "notification-id": "[NOTIFICATION-ID]",
  "notification-type": "[CATEGORY-REFERENCE TO TYPE OF EVENT]",
  "notification-timestamp": "[TIMESTAMP OF EVENT INGESTION]",
  "message": {
    "payload-location": "[LOCATION OF RAW PAYLOAD IN STORAGE]",
    "meta-data": {
      # [META-DATA]
      # [EXTRACTED FROM PAYLOAD]
      # [INHERITED FROM PREVIOUS STAGE EVENT IN PIPELINE]
```

TABLE 1-continued

```
    # [TIME RANGE OF THE BATCHED EVENT]
    }
  }
 }
}
```

The ingestion component 104 can store the event notification in the event notification data store 120 of the event stream 110 to which the event is assigned. The event notification data store 120 may be configured as a queue for temporary storage of event notifications to be handled by other components of the event pipeline system 100. The queue may be implemented as a first-in-first-out ("FIFO") structure in which earlier-queued event notifications are provided to components of the event pipeline system 100 before later-queued event notifications. In some embodiments, the queue may be implemented as a priority queue such that other components of the event pipeline system 100 may in some cases be provided with later-queued event notifications before earlier-queued event notifications (or without ever being provided the earlier-queued event notifications). In some embodiments, the queue may be implemented as a searchable queue such that sets of event notifications satisfying one or more selection criteria are provided, in some cases without regard to placement within the queue.

At decision block 210, the event pipeline system 100 can determine whether the prior operation has triggered processing by a processing component or delivery of an event payload. If processing has been triggered, the process 200 may proceed to 212, where the processing component may begin processing by obtaining an event notification from a notification data store 120 of an event stream 110. Illustratively, the processing component may be a transformation component 112, batch component 114, join component 116, delivery component 106, some other component, or some combination thereof. In some embodiments, various components of the event pipeline system 100 may subscribe to various event streams 110 and may receive or retrieve event notifications that are added to the event streams 110 to which they subscribe. In such cases, storing an event notification may trigger a processing action immediately, or upon a predetermined or dynamically determined schedule (e.g., event notifications stored in an event stream 110 are distributed every x units of time, where x is any number and the units may be milliseconds, seconds, minutes, hours, days, or the like).

Figure 3:
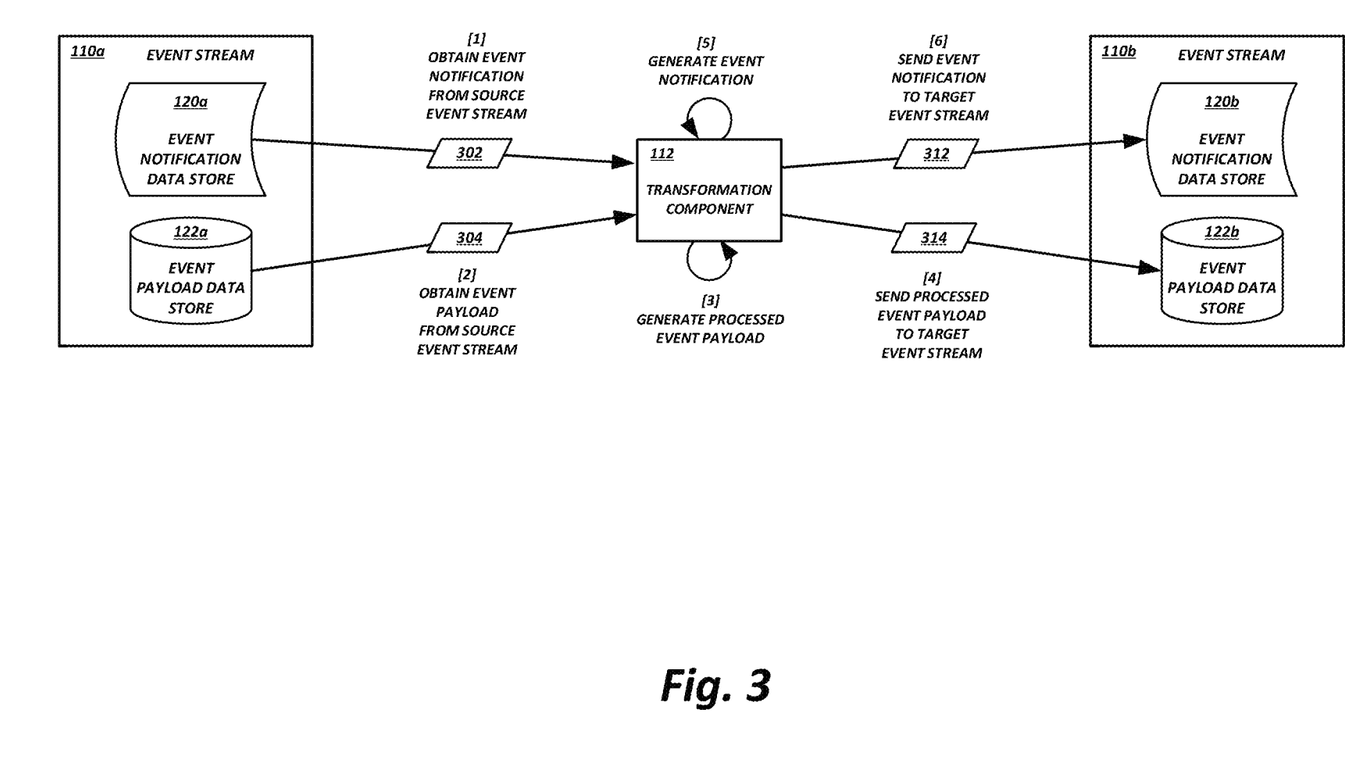
FIG. 3 is a block diagram of illustrative data flows and interactions between components of an event pipeline system during transformation processing of event data according to some embodiments.

FIG. 3 shows an example of the triggered processing component being a transformation component 112 that performs processing to transform an event payload from a source event stream into a processed event payload for a target event stream. As shown, at [1] the transformation component 112 obtains an event notification 302 from a notification store 120a of an event stream 110a. An example of the notification is shown in Table 2. The subsequent steps illustrated in FIG. 3 are described in greater detail below with reference to blocks of process 200.

TABLE 2

```
{
  "notification-id": "1001",
  "notification-type": "order-event",
  "notification-timestamp": "22-Jan-2020 1:00pm",
  "message": {
    "payload-location": "/publisher/order/order-123.xml",
```

TABLE 2-continued

```
    "meta-data": {
      "hotel-chain-id": "acme-1"
    }
  }
}
```

Returning to FIG. 2, at block 214 the processing component can analyze the event notification. The event notification may be analyzed to obtain a storage location for the corresponding event payload. In some cases, the processing component may analyze the event notification to make various processing decisions. For example, the processing component may analyze additional notification data and/or metadata in the event notification to make decisions regarding transforming the corresponding event payload, batching the corresponding event payload with other event payloads, joining the corresponding event payload with an event payload of another data stream, or the like, as described in greater detail below.

At block 216, the processing component can obtain the corresponding event payload from the storage location at the event payload data store 120 of the event stream 110.

FIG. 3 shows at [2] the transformation component 112 obtaining event payload 304 from event payload data store 122a of event stream 110a. An example of the event payload 304 as a travel item order record in eXtensible Markup Language ("XML") format is shown in Table 3.

TABLE 3

```
<?xml version="1.0">
<order>
  <id>12345</id>
  <timestamp>22-Jan-2020 11:20am</timestamp>
  <hotel-id>acme-seatlle-123</hotel-id>
  <hotel-chain-id>acme-1</hotel-chain-id>
  <price>
    <baseprice>235</baseprice>
    <tax>2.35</tax>
  </price>
  <travel-date>
    <from>12-Feb-2020</from>
    <to>15-Feb-2020</to>
  </travel-date>
  <guest-count>4</guest-count>
  <room-count>2</room>
</order>
```

At block 218, the processing component can perform processing on the obtained event payload to generate a processed event payload. A processed event payload may include data of the event payload, obtained at block 216, that has been re-formatted, filtered, augmented, or otherwise transformed.

In the example of FIG. 3, the transformation component 112 may generate an event payload 314 at [3] that is a JavaScript Object Notation ("JSON") version of the XML event payload 304. An example of the processed event payload 314 is shown in Table 4.

TABLE 4

```
{
    "order-id": 12345,
    "timestamp": "22-Jan-2020 11:20am",
    "hotel-id": "acme-seattlle-123",
    "hotel-chain-id": "acme-1",
    "price": {
        "baseprice": 235,
        "tax": 2.35
    },
    "travel-date": {
        "from": "12-Feb-2020",
        "to": "15-Feb-2020"
    },
    "guest-count": 4,
    "room-count": 2
}
```

At block 220, the processing component can store an event payload (either the event payload obtained in block 216 or, if processing has been performed, the processed event payload generated at block 218) in the event payload data store of a target event stream. The processing component may track, or be provided with, the particular storage location at which the event payload is stored in the event payload data store of the target event stream so that the storage location can be included in the event notification that is generated, as described in greater detail below.

In the example of FIG. 3, at [4] the transformation component 112 stores the processed event payload 314 to the event payload data store 122b of the event stream 110b to which the event is being added. The transformation component 112 retains storage location data representing the location within the event payload data store 122b at which the processed event payload is stored.

At block 222, the processing component can generate an event notification for the target event stream. Illustratively, the processing component may generate an event notification as described above with respect to block 208, using the storage location of the event payload data stored in block 220 and any other information associated with the current event. The event notification can be placed in the target event stream where it is stored in the event notification data store of the target event stream.

In the example shown in FIG. 3, at [5] the transformation component 112 generates event notification 312 with information regarding the event, such as the storage location at which the processed event payload 314 is stored in the event payload data store 122b. An example of the event notification 312 is shown in Table 5. At [6], the transformation component may send the event notification to target event stream 110b where it is placed in the corresponding event notification data store 120b.

TABLE 5

```
{
    "notification-id": "axefy-234af",
    "notification-type": "order-event",
    "notification-timestamp": "22-Jan-2020 1:00pm",
    "message": {
        "payload-location": "/publisher/order/order-123.json",
        "meta-data": {
            "hotel-chain-id": "acme-1"
        }
    }
}
```

After the processing component has generated the event notification for the target event stream and the event notification has been added to the corresponding event notification data store, the process 200 may return to decision block 210 to determine whether, when, and/or what type of processing has been triggered. In some cases, the same processing component and/or one or more additional processing components may be triggered based on subscriptions to event streams, triggering criteria, or the like.

With reference to one illustrative embodiment, the event that was processed as described above and shown in FIG. 3 may have represented a single order that is received by the event pipeline system 100 in a particular period of time (e.g., one hour). Any number of additional events may be received during the period of time, and each event may correspond to another order and may or may not be similarly processed, depending upon the nature of the events, the format in which they are received, the source of the events, or other criteria. All such events received during the period of time may be batched into a single event that can be joined with another event for the period of time, such as an event regarding supply to be reconciled with the orders. The joined event may then be provided to one or more event subscribers for auditing, archiving, and the like. The operations of the batch component 114, join component 116, and delivery component 106 are described below in the context of this illustrative embodiment and with reference to the relevant portions of the process 200 and also FIGS. 1, 4, and 5. However, as will be appreciated, the embodiments described herein are illustrative only, and are not intended to be required, exhaustive, or limiting of the types of processing, sequences of processing, and combinations of processing that may be used by the event pipeline system 100.

Returning to decision block 210, the event pipeline system 100 may determine that no additional processing is triggered for a particular event and/or that delivery of event payload data has been triggered. The process 200 can proceed to block 224, where a delivery component 106 can obtain an event notification from an event stream, determine the storage location of a corresponding event payload, and deliver the event payload to one or more event data subscribers 108 and/or other components, systems, or devices. The process 200 may terminate at block 226. In some embodiments, the process 200 may return to decision block 210, where additional processing or additional delivery operations may be triggered.

Example Batched Event Generation Process

Figure 4:
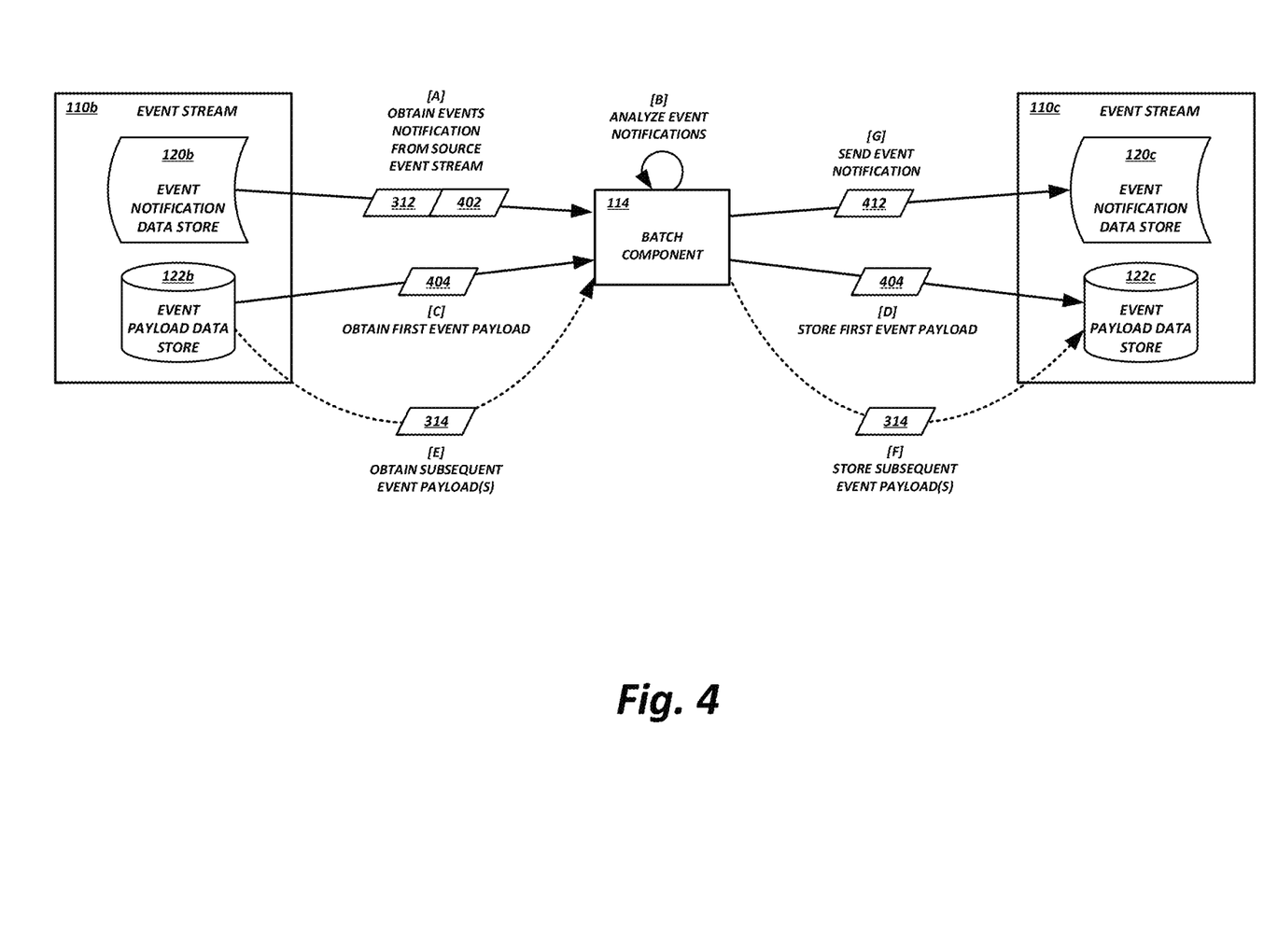
FIG. 4 is a block diagram of illustrative data flows and interactions between components of an event pipeline system during batch processing of event data according to some embodiments.

FIG. 4 shows an example of a batch component 114 generating a batched event in response to being triggered at decision block 210 of process 200. The illustrated example includes batching events from event stream 110b into a batch event for event stream 110c. Advantageously, all event payloads from event stream 110b that are to be included may be combined into a single event payload for event stream 110c, even if such a batched event will be significantly larger (e.g., require significantly more storage) that the individual events.

At block 212 of process 200 and as shown in FIG. 4 at [A], the batch component 114 may obtain event notifications from event stream 110b to be batched into a single batched event. The event notifications for the events to be batched may be event notifications that satisfy one or more batch criteria. For example, the event notifications may correspond to events that have all been ingested by the event pipeline system within a time window for the current batch operation. As another example, the event notifications may all be associated with a particular type of event. As a further example, the event notifications may all include a particular metadata value (e.g., the same value for the "hotel-chain-id"

field). The batch criteria may include one or more of such criteria, such as combination of the three example criteria described here.

In some embodiments, the batch component 114 may only be provided with event notifications that satisfy the batch criteria for the batch operation to be performed. For example, the batch component 114 may subscribe to only event notifications that satisfy one or more batch criteria, and may receive the event notifications in a "push" manner from the event stream 110b. As another example, the batch component 114 may access the event stream 110b and obtain only event notifications that satisfy one or more batch criteria, receiving the event notifications in a "pull" manner from the event stream 110b.

In some embodiments, the batch component 114 may be provided with event notifications that may not necessarily satisfy a current set of batch criteria. The batch component 114 may maintain the event notifications until they are needed for a batch operation, or the batch component 114 may return the event notifications to the event stream 110b.

In the example of FIG. 4, the batch component obtains event notification 312 (shown in Table 5 and described in greater detail above) and event notification 402. Event notification 402 may have the same value for the "notification-type" and "hotel-chain-id" fields as event notification 312. In addition, event notification 402 may have a value for the "notification-timestamp" that falls within the same time window as event notification 312. Thus, both event notification 312 and 402 may satisfy batch criteria that specifies all event notifications from stream 110b within the particular time window having the particular combination of "notification-type" and "hotel-chain-id" field values.

At block 214, the batch component 114 may analyze the event notifications 312 and 402 received from the event stream 110b. As shown in FIG. 4. at [B], the batch component 114 analyzes the event notifications to determine the storage location of the associated event payloads. In some embodiments, the batch component 114 may analyze the event notifications for other purposes. For example, if the batch component 114 is provided with event notifications that do not necessarily satisfy batch criteria for a current batching process, the batch component 114 may filter the notifications to identify those that are to be part of the current batch operation.

At block 216 and as shown in FIG. 4 at [C], the batch component 114 may obtain the first event payload 314 to be included in the batched event. At block 220 and as shown in FIG. 4 at [D], the event payload 314 may be written to batched event payload 414 in event payload data store 122c for the batched event stream 100c. In some embodiments, before or as part of the process of writing the first event payload to the batched event payload, the batch component 114 may generate a data structure within the event payload data store 122c for the batched event payload 414. The data structure for the batched event payload 414 may include high-level information regarding the batch, such as the batch criteria (e.g., time window, metadata values, etc.).

When written to the batched event payload 414, the data of event payload 314 may remain same, or substantially the same. For example, the data of event payload 314, when written to batched event payload 414, may remain identical with the exception of one or more value changes or formatting modifications to facilitate batching with other event payloads, such as the addition of a sequence or identifier within the batch, re-formatting as an element of a larger batch, etc.

In some embodiments, the batch component 114 may load each event payload from the event payload data store 122b and write the event payload to the batched event payload 414 in event payload data store 122c individually, before loading the next event payload from the event payload data store 122b. Such processing, which may be referred to as streaming processing, includes returning to block 218 and block 220 of FIG. 2—and operations [E] and [F] of FIG. 4—for each event payload to be included in the batched event payload. Thus, only a single event payload for the batched event payload is loaded into memory of the batch component 114 at a given time. In this way, the batch component 114 can generate batched event payloads of any size, comprising any number of individual event payloads from another event stream, without regard to the memory and other processing limitations of the batch component 114.

In some embodiments, the batch component 114 may load a subset of event payloads from the event payload data store 122b and write the subset to the batched event payload 414 in event payload data store 112b before loading another subset of event payloads from the event payload data store 122b. In this way, the batch component 114 may reduce the number of read and write operations while still obtaining the benefit of streaming event processing that reduces or eliminates the impact of memory and other processing limitations of the batch component 114.

An example of a batched event payload 414 with two individual event payloads 314, 404 from event stream 110b is shown in Table 6.

TABLE 6

```
{
  "hotel-chain-id": "acme-123",
  "batch-timestamp-range": {
    "start": "22-Jan-2020 11:00am",
    "end": "22-Jan-2020 12:00pm"
  },
  "orders": [
    {
      "order-id": 12345,
      "timestamp": "22-Jan-2020 11:20am",
      "hotel-id": "acme-seattlle-123",
      "hotel-chain-id": "acme-1",
      "price": {
        "baseprice": 235,
        "tax": 2.35
      },
      "travel-date": {
        "from": "12-Feb-2020",
        "to": "15-Feb-2020"
      },
      "guest-count": 4,
      "room-count": 2
    },
    {
      "order-id": 12346,
      "timestamp": "22-Jan-2020 11:40am",
      "hotel-id": "acme-la-456",
      "hotel-chain-id": "acme-1",
      "price": {
        "baseprice": 90,
        "tax": 10.2
      },
      "travel-date": {
        "from": "20-Feb-2020",
        "to": "24-Feb-2020"
      },
      "guest-count": 2,
      "room-count": 1
    }
  ]
}
```

At block 222, the batch component 114 can generate an event notification for the batched event stream 110c. Illustratively, the batch component 114 may generate an event notification as described above, using the storage location of the batched event payload data stored in block 220 and any other information associated with the current event. As shown in FIG. 4 at [G], the batched event notification 412 can be placed in the batched event stream 110c where it is stored in the event notification data store 120c.

Example Joined Event Generation Process

Figure 5:
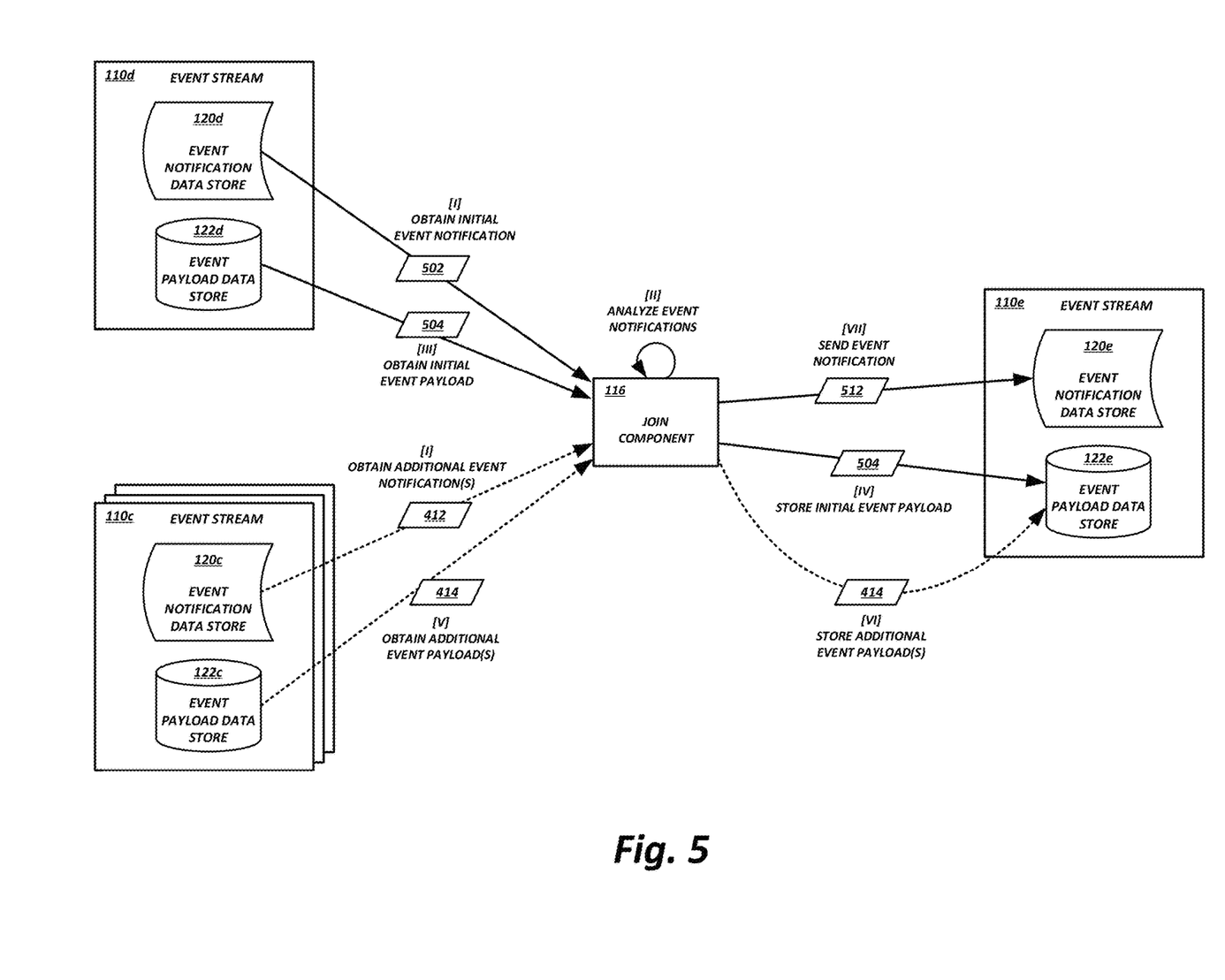
FIG. 5 is a block diagram of illustrative data flows and interactions between components of an event pipeline system to join multiple streams of event data according to some embodiments.

FIG. 5 shows an example of a join component 116 generating a joined event in response to being triggered at decision block 210 of process 200. The illustrated example includes joining events from event stream 110c and 110d into a joined event for event stream 110e. Advantageously, event payloads from event streams 110c and 110d that are to be included may be combined into a single event payload for event stream 110e, even if such a joined event will be significantly larger (e.g., require significantly more storage) that the individual events.

At block 212 process 200 and as shown in FIG. 5 at [I], the join component 116 may obtain event notifications from event streams 110c and 110d to be joined into a single joined event. The event notifications for the events to be joined may be event notifications that satisfy one or more join criteria. In some embodiments, satisfaction of join criteria may be determined as described above with respect to satisfaction of batching criteria. For example, event notification 502 from event stream 110d may be an event notification for a supply event that corresponds to the batched event notification 412 of batched event stream 110c by virtue of the time periods referenced in the event notifications 502, 412, metadata in the event notifications 502, 412 (e.g., the same value for the "hotel-chain-id" field), etc.

At block 214, the join component 116 may analyze the event notifications 502, 412 received from the event streams 110c, 110d. As shown in FIG. 5. at [II], the join component 116 analyzes the event notifications to determine the storage location of the associated event payloads. In some embodiments, the join component 116 may analyze the event notifications for other purposes. For example, if the join component 116 is provided with event notifications that do not necessarily satisfy join criteria for a current joining process, the join component 116 may filter the notifications to identify those that are to be part of the current join operation.

At block 216 and as shown in FIG. 5 at [III], the join component 116 may obtain the first event payload 504 to be included in the joined event. In this example, the event payload 504 may be from data stream 110d, and may represent a period event with details against which the batched payload 414 is to be reconciled. An example of such a payload with details regarding travel item transactions is shown in Table 7.

TABLE 7

{
  "hotel-chain-id": "acme-1",
  "time-range": {
    "start": "22-Jan-2020 11:00am",
    "end": "22-Jan-2020 12:00pm"
  },
  "supply-batch": [
    {
      "order-id": 12345,
      "hotel-name": "Acme Seattle",
      "amount": 237.35

TABLE 7-continued

},
    {
      "order-id": 12346,
      "hotel-name": "Acme LA",
      "amount": 100.2
    }
  ]
}

At block 220 and as shown in FIG. 5 at [IV], the event payload 504 may be written to joined event payload 514 in event payload data store 122e for the joined event stream 110e. In some embodiments, before or as part of the process of writing the first event payload to the joined event payload, the join component 116 may generate a data structure within the event payload data store 122e for the joined event payload 514. The data structure for the joined event payload 514 may include high-level information regarding the joined event, such as the join criteria (e.g., time window, metadata values, etc.).

When written to the joined event payload 514, the data of event payload 504 may remain same, or substantially the same. For example, the data of event payload 504, when written to joined event payload 514, may remain identical with the exception of one or more value changes or formatting modifications to facilitate joining with other event payloads of other event streams which may have different fields, formats, etc. Illustratively, join component 116 may include a sequence or identifier within the joined event, re-formatting as an element of a larger event, etc.

In some embodiments, the join component 116 may load each event payload to be included in the joined event payload 514 and write the event payload to the joined event payload 514 in event payload data store 122e individually, before loading the next event payload to be included in the joined event payload. Such processing, which may be referred to as streaming processing, includes returning to block 218 and block 220 of FIG. 2—and operations [V] and [VI] of FIG. 4—for each event payload to be included in the joined event payload. Thus, only a single event payload for the joined event payload is loaded into memory of the join component 116 at a given time. In this way, the join component 116 can generate joined event payloads of any size, comprising any number of individual event payloads from any number of event streams, event stream, without regard to the memory and other processing limitations of the join component 116.

In some embodiments, the join component 116 may load a subset of event payloads to be included in the joined event payload 514, and write the subset to the joined event payload 514 in event payload data store 112e before loading another subset of event payloads. In this way, the join component 116 may reduce the number of read and write operations while still obtaining the benefit of streaming event processing that reduces or eliminates the impact of memory and other processing limitations of the join component 116.

An example of a joined event payload 514 with event payloads 504, 414 from two different event streams 110c, 110d is shown in Table 8.

TABLE 8

{
  "join-key": {
    "hotel-chain-id": "acme-1",
    "time-range": {

TABLE 8-continued

```
    "start": "22-Jan-2020 11:00am",
    "end": "22-Jan-2020 12:00pm"
  }
},
"supply-record": {
  "hotel-chain-id": "acme-1",
  "time-range": {
    "start": "22-Jan-2020 11:00am",
    "end": "22-Jan-2020 12:00pm"
  },
  "supply-batch": [
    {
      "order-id": 12345,
      "hotel-name": "Acme Seattle",
      "amount": 237.35
    },
    {
      "order-id": 12346,
      "hotel-name": "Acme LA",
      "amount": 100.2
    }
  ]
},
"order-batch": {
  "hotel-chain-id": "acme-123",
  "batch-timestamp-range": {
    "start": "22-Jan-2020 11:00am",
    "end": "22-Jan-2020 12:00pm"
  },
  "orders": [
    {
      "order-id": 12345,
      "timestamp": "22-Jan-2020 11:20am",
      "hotel-id": "acme-seattlle-123",
      "hotel-chain-id": "acme-1",
      "price": {
        "baseprice": 235,
        "tax": 2.35
      },
      "travel-date": {
        "from": "12-Feb-2020",
        "to": "15-Feb-2020"
      },
      "guest-count": 4,
      "room-count": 2
    },
    {
      "order-id": 12346,
      "timestamp": "22-Jan-2020 11:40am",
      "hotel-id": "acme-la-456",
      "hotel-chain-id": "acme-1",
      "price": {
        "baseprice": 90,
        "tax": 10.2
      },
      "travel-date": {
        "from": "20-Feb-2020",
        "to": "24-Feb-2020"
      },
      "guest-count": 2,
      "room-count": 1
    }
  ]
}
}
```

At block 222, the join component 116 can generate an event notification for the joined event stream 110e. Illustratively, the join component 116 may generate an event notification as described above, using the storage location of the joined event payload data stored in block 220 and any other information associated with the current event. As shown in FIG. 5 at [VII], the event notification 512 can be placed in the joined event stream 110e where it is stored in the event notification data store 120e.

Example Computing System Components

FIG. 6 shows components of a computing system 600 that may be used to implement components event pipeline system 100. In some embodiments, as shown, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; one or more input/output device interfaces 608, and one or more computer readable memories 610, such as random access memory ("RAM") and/or other volatile non-transitory computer-readable media. The computer readable memory 610 may include computer program instructions that the computer processor(s) 602 execute in order to implement one or more embodiments. For example, the computer readable memory 610 can store an operating system 612 that provides computer program instructions for use by the computer processor 602 in the general administration and operation of the computing system 600. The computer readable memory 610 may also include event orchestration instructions 614 for implementing features of one or more components of the event pipeline system 100, such as the ingestion component 104, transformation component 112, batch component 114, join component 116, delivery component 106, instructions for performing the process 200 shown in FIG. 2, etc.

The computing system 600 may communicate with other computing systems of the event pipeline system 100, various data stores, computing systems external to the event pipeline system 100, etc. via a communication network 640. For example, the computing system 600 may communicate with various notification data queues 620 to obtain and store event notifications. As another example, the computing system 600 may communicate with various object data stores 630 to obtain and store event payloads.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An event pipeline system comprising:
   an event ingestion component comprising one or more computing devices, wherein the event ingestion component is configured to:
   receive a data object to be added to a first event stream;
   store the data object as a first event payload at a first storage location in a first event payload data store of the first event stream; and
   store a first event notification in a first event notification data store of the first event stream, the first event notification referencing the first storage location;
   a batch component comprising one or more computing devices, wherein the batch component is configured to:
   obtain the first event notification and at least a second event notification from the first event notification data store based at least partly on each of the first event notification and the second event notification satisfying a batch criterion;
   generate a batched event payload at a second storage location in a batched event payload data store of a batched event stream using event payload data associated with event notifications satisfying the batch criterion, wherein to generate the batched event payload, the batch component is configured to store at least a portion of the first event payload to the second storage location prior to loading at least a portion of a second event payload from a storage location in the first event payload data store referenced by the second event notification; and
   store a single batched event notification for the batched event payload in a batched event notification data store of the batched event stream, the batched event notification referencing the second storage location; and
   a join component comprising one or more computing devices, wherein the join component is configured to:

obtain the batched event notification from the batched event notification data store and at least a third event notification from a third event notification data store associated with a third event stream, wherein each of the batched event notification and the third event notification satisfy a join criterion;

generate a joined event payload at a fourth storage location in a joined event payload data store of a joined event stream using event payload data associated with event notifications satisfying the join criterion, wherein to generate the joined event payload, the join component is configured to store at least a portion of a third event payload, referenced by the third event notification, to the fourth storage location prior to loading at least a portion of the batched event payload; and store a single joined event notification for the joined event payload in a joined event notification data store of the joined event stream, the joined event notification referencing the second storage location.

2. The system of claim 1, further comprising a transformation component comprising one or more computing devices, wherein the transformation component is configured to:

obtain a source event notification from a notification data store of a source event stream;

extract a source event payload storage location from the source event notification;

obtain a source event payload from the source event payload storage location of an event payload data store of the source event stream;

generate a transformed event payload from the source event payload;

store the transformed event payload to a transformed event payload storage location of an event payload data store of a target event stream; and store a transformed event notification in an event notification data store of the target event stream, the transformed event notification referencing the transformed event payload storage location.

3. The system of claim 2, wherein to generate the transformed event payload, the transformation component is configured to apply to the source event payload at least one of: a formatting transformation, a content transformation, a filter, or an augmentation.

4. The system of claim 1, further comprising a delivery component comprising one or more computing devices, wherein the delivery component is configured to:

obtain a subscribed event notification from a notification data store of a subscribed event stream;

extract a subscribed event payload storage location from the subscribed event notification;

obtain a subscribed event payload from the subscribed event payload storage location of an event payload data store of the subscribed event stream; and provide the subscribed event payload to an event subscriber device.

5. A computer-implemented method comprising:

under control of a computing system comprising one or more computing devices configured to execute specific instructions, determining to generate a batched event from a plurality of events satisfying a selection criterion, wherein the plurality of events are associated with a first event stream comprising a first notification data store and a first payload data store;

for each event of the plurality of events satisfying the selection criterion:

obtaining a corresponding event notification from the first notification data store;

extracting, from the corresponding event notification, location data for a corresponding event payload in the first payload data store;

obtaining the corresponding event payload from the first payload data store; and storing, at a batch storage location in a second event payload data store associated with a second event stream, at least a portion of the corresponding event payload; and sending a batched event notification to a second event notification data store associated with the second event stream, wherein the batched event notification comprises metadata regarding the batched event and the batch storage location.

6. The computer-implemented method of claim 5, wherein sending the batched event notification to the second event notification data store comprises sending the batched event notification to a first computing device that is different than a second computing device at which the batch storage location is located.

7. The computer-implemented method of claim 5, wherein sending the batched event notification to the second event notification data store comprises sending the batched event notification to an event notification queue.

8. The computer-implemented method of claim 5, further comprising determining the batch storage location, wherein the batch storage location comprises a path of a data object in an object data store.

9. The computer-implemented method of claim 5, wherein first event payload data corresponding to a first event of the plurality of events is stored at the batch storage location prior to obtaining second event payload data corresponding to a second event of the plurality of events.

10. The computer-implemented method of claim 5, further comprising determining the selection criterion, wherein the selection criterion comprises a time window within which a timestamp of each corresponding event notification is to reference.

11. The computer-implemented method of claim 5, further comprising maintaining within memory an event notification that does not satisfy the selection criterion.

12. The computer-implemented method of claim 5, further comprising:

obtaining a subscribed event notification from a notification data store of a subscribed event stream;

extracting a subscribed event payload storage location from the subscribed event notification;

obtaining a subscribed event payload from the subscribed event payload storage location of an event payload data store of the subscribed event stream; and providing the subscribed event payload to an event subscriber device.

13. The computer-implemented method of claim 5, further comprising:

obtaining a source event notification from a notification data store of a source event stream;

extracting a source event payload storage location from the source event notification;

obtaining a source event payload from the source event payload storage location of an event payload data store of the source event stream;

generating a transformed event payload from the source event payload;

storing the transformed event payload to a transformed event payload storage location of an event payload data store of a target event stream; and storing a transformed event notification in an event notification data store of the target event stream, the transformed event notification referencing the transformed event payload storage location.

14. The computer-implemented method of claim 13, wherein generating the transformed event payload from the source event payload comprises applying, to the source event payload, at least one of: a formatting transformation, a content transformation, a filter, or an augmentation.

15. A computer-implemented method comprising:

under control of a computing system comprising one or more computing devices configured to execute specific instructions, determining to generate a joined event from a plurality of events satisfying a selection criterion, wherein the plurality of events comprises at least a first event from a first event stream and a second event from a second event stream different than the first event stream, wherein the first event stream comprises a first notification data store and a first payload data store, and wherein the second event stream comprises a second notification data store and a second payload data store;

for each event of the plurality of events satisfying the selection criterion:

obtaining a corresponding event notification from a corresponding notification data store;

extracting, from the corresponding event notification, location data for a corresponding event payload in a corresponding payload data store;

obtaining the corresponding event payload from the corresponding payload data store; and storing, at a target storage location in a target event payload data store associated with a target event stream, at least a portion of the corresponding event payload; and sending a joined event notification to a target event notification data store associated with the target event stream, wherein the joined event notification comprises metadata regarding the joined event and the target storage location.

16. The computer-implemented method of claim 15, wherein sending the joined event notification to the target event notification data store comprises sending the joined event notification to a first computing device that is different than a second computing device at which the target storage location is located.

17. The computer-implemented method of claim 15, wherein sending the joined event notification to the target event notification data store comprises sending the joined event notification to an event notification queue.

18. The computer-implemented method of claim 15, further comprising determining the target storage location, wherein the target storage location comprises a path of a data object in an object data store.

19. The computer-implemented method of claim 15, wherein first event payload data corresponding to a first event of the plurality of events is stored at the target storage location prior to obtaining second event payload data corresponding to a second event of the plurality of events.

20. The computer-implemented method of claim 15, further comprising determining the selection criterion, wherein the selection criterion comprises a time window within which a timestamp of each corresponding event notification is to reference.

* * * * *